United States Patent [19]

Murphey et al.

[11] Patent Number: 4,829,100

[45] Date of Patent: May 9, 1989

[54] CONTINUOUSLY FORMING AND TRANSPORTING CONSOLIDATABLE RESIN COATED PARTICULATE MATERIALS IN AQUEOUS GELS

[75] Inventors: Joseph R. Murphey; Kenneth D. Totty, both of Duncan, Okla.

[73] Assignee: Halliburton Company, Duncan, Okla.

[21] Appl. No.: 112,782

[22] Filed: Oct. 23, 1987

[51] Int. Cl.⁴ .................. C08L 5/00; C08L 63/00; C09K 7/02

[52] U.S. Cl. .................... 523/131; 166/295; 523/402; 523/417; 523/426

[58] Field of Search ............... 523/131, 402, 417, 426; 166/295

[56] References Cited

U.S. PATENT DOCUMENTS

| | | | |
|---|---|---|---|
| 3,625,287 | 12/1971 | Young | 166/295 |
| 4,074,760 | 2/1978 | Copeland et al. | 166/276 |
| 4,101,474 | 7/1978 | Copeland et al. | 260/13 |
| 4,199,484 | 4/1980 | Murphey | 260/13 |
| 4,247,430 | 1/1981 | Constien | 260/29.2 EP |

Primary Examiner—C. Warren Ivy
Attorney, Agent, or Firm—Robert A. Kent

[57] ABSTRACT

Methods of continuously forming and suspending consolidatable resin composition coated particulate material in a gelled aqueous carrier liquid and transporting the coated particulate material by way of the gelled aqueous carrier liquid to a zone in which the sand is consolidated. In accordance with the methods, substantially continuous streams of a gelled aqueous carrier liquid, uncoated particulate material, a resin composition which will subsequently harden and a surface active agent are admixed whereby the particulate material is continuously coated with the resin composition and suspended in the gelled aqueous carrier liquid.

17 Claims, 2 Drawing Sheets

CONTINUOUSLY FORMING AND TRANSPORTING CONSOLIDATABLE RESIN COATED PARTICULATE MATERIALS IN AQUEOUS GELS

BACKGROUND OF THE INVENTION

1. Field of the Invention

This invention provides a method of continuously coating a particulate material with a resin in the presence of an aqueous gel. The product of the method, a resin-coated particulate material, is especially useful in the treatment of subterranean oil and gas producing formations for the purpose of forming consolidations of the particulate material therein. The consolidations function to help control loose formation sand and to help retain loose proppants placed in fractures formed therein.

2. Description of the Prior Art

Processes and techniques have been developed for consolidating particulate material, e.g., sand, into a hard permeable mass in a subterranean zone.

These processes are useful in treating a subterranean formation containing loose or incompetent sands which migrate with hydrocarbons produced therefrom. The consolidated particulate material reduces or prevents such migration when it is placed between the producing formation and the well bore penetrating the formation. The formation of the consolidated, permeable, particulate mass has been accomplished by coating formation sand adjacent the well bore with a hardenable resin, and then causing the resin to harden. An alternate technique has been to coat sand with a resin on the surface, to suspend the coated sand in a carrier liquid and then to pump the suspension by way of the well bore into the formation containing loose or incompetent sands to deposit the coated sand therein. The resin on the deposited sand is then caused or permitted to harden whereby a consolidated, hard permeable mass is formed between the well bore and the loose or incompetent sands in the formation.

The previously developed methods have been used successfully in applications featuring resin coating of particulate material by batch mixing of component streams, but these methods have not been desirable in applications which require the rapid coating of particulate material suspended in continuous streams of a carrier liquid. For example, it is often necessary that resin-coated particulate material be continuously carried into a subterranean formation by a gelled aqueous carrier liquid for a relatively long period of time in order to deposit the resin-coated material and hold it in place against the face of the formation or to deposit the material in fractures formed in the formation. In such applications, if the flow rate of the carrier liquid is reduced or interrupted, the resin coated particulate material carried in the liquid can be deposited in undesired locations such as in surface equipment or in the well bore instead of in formation fractures or other specific desired locations.

The batch mixing methods for producing continuous streams of gelled aqueous carrier liquids containing resin coated particulate materials are time-consuming and expensive and are attended by risks of flow rate interruption or reduction. For example, U.S. Pat. No. 4,074,760 describes a method of forming a consolidated particulate mass in a subterranean formation wherein sand, coated with a resin, is suspended in a gelled aqueous carrier liquid. The carrier liquid is introduced into a subterranean zone whereby the resin coated sand is deposited and subsequently consolidated therein. The preparation of the suspension of carrier liquid and coated sand involves the batch mixing of components, i.e., the gelled aqueous carrier liquid containing sand is prepared separately from the resin followed by the batch mixing of the two for the period of time required to coat the sand with the resin.

U.S. Pat. No. 4,199,484 discloses a method of preparing a suspension of a particulate material coated with an epoxy resin in a gelled aqueous carrier liquid wherein the coating of the sand is carried out in the gelled aqueous carrier liquid. According to this method, the gelled carrier liquid, sand and other components are first combined followed by the addition of the epoxy resin with mixing whereby the epoxy resin coats the sand. The batch mixing of the components requires a period of time, e.g., at least about 15 minutes to several hours to obtain satisfactory coating of the particulate material before the slurry may be introduced into a placement zone. These prior art methods for forming suspensions of gelled aqueous carrier liquid and resin coated particulate material are not carried out on a substantially instantaneous and continuous basis.

SUMMARY OF THE INVENTION

By the present invention, a method of rapidly and continuously forming a consolidatable, resin-coated, particulate material in the presence of an aqueous gelled carrier liquid is provided to produce a gelled carrier liquid containing the coated particulate material suspended therein; the suspension can be continuously introduced into a subterranean zone over an extended period of time.

The method is comprised of substantially continuously admixing streams of gelled aqueous carrier liquid, particulate material, a resin composition and a surface active agent. The particulate material is substantially continuously coated with the resin and suspended in the gelled aqueous carrier liquid.

A substantially continuous stream of the gelled aqueous carrier liquid having the coated particulate material suspended therein can be introduced into a subterranean formation over the period of time necessary to deposit therein the quantity of coated particulate material required to form the desired hard permeable mass. The resin on the coated particulate material is then allowed to harden whereby the deposit is consolidated into a hard permeable mass in the formation.

The method of the present invention and the various chemical components useful therein are described in detail in the Description of Preferred Embodiments which follows.

DESCRIPTION OF PREFERRED EMBODIMENTS

Figure 1:
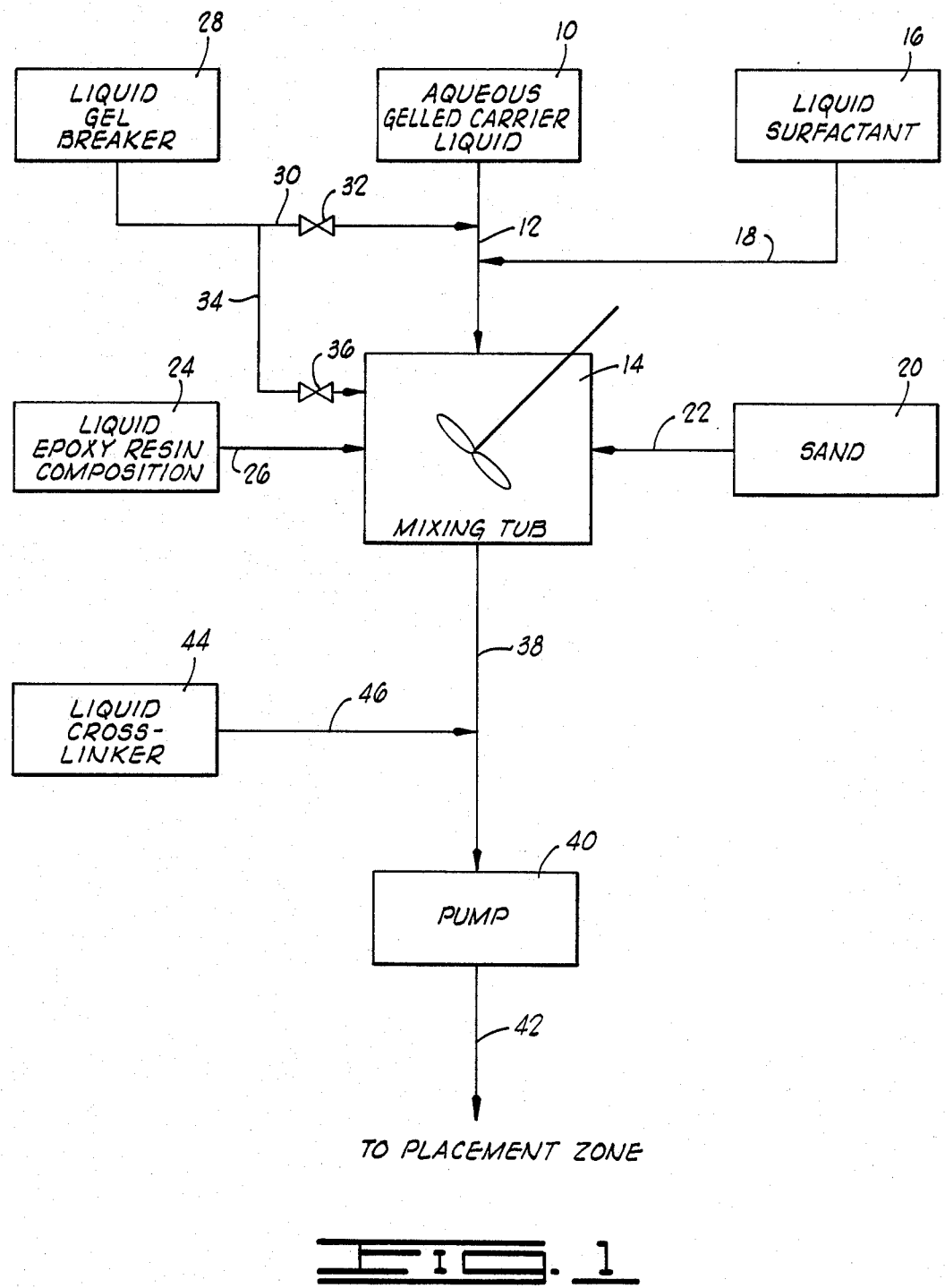
FIG. 1 is a schematic illustration of one system of apparatus for performing the methods of the present invention.

In accordance with the methods of the present invention, a substantially continuous stream of particulate material, e.g., sand, is substantially instantaneously coated with a continuous stream of resin which will subsequently harden; the coated particulate material is simultaneously suspended in a gelled aqueous carrier liquid. The resin has a sufficiently long curing or working time to enable continuous deposition of the suspension of gelled aqueous carrier liquid and coated particulate material in a desired location of a subterranean zone. Subsequent hardening of the resin in the zone produces the desired hard permeable mass of consolidated particulate material.

The gelled aqueous carrier liquids utilized in this invention are formed by hydrating polysaccharide polymer gelling agents in fresh water, brine or seawater. The polysaccharide polymer gelling agents useful have molecular weights in the range of from about 100,000 to 4,000,000, preferably from about 600,000 to about 2,400,000, and are preferably cellulose or guar derivatives. The polymers include substituents such as hydroxy ethyl to give the necessary water hydration and gel characteristics to produce a clear aqueous gel having a viscosity of at least about 30 centipoises (reading on Fann V.G. meter at 300 rpm). Preferred polymers include substituted carboxy and hydroxy alkyl cellulose, such as hydroxyethylcellulose and carboxymethylhydroxyethylcellulose, and substituted hydroxy alkyl guar, such as hydroxypropylguar. Most preferably, the gelling agent is hydroxypropylguar or carboxymethylhydroxypropyl guar having a molecular weight in the range of from about 100,000 to about 4,000,000, and having a propylene oxide substitution (M.S.) of about 0.1 to about 0.7 moles propylene oxide per mole of mannose and galactose in the guar.

The gelled aqueous carrier liquid is preferably prepared by combining the polysaccharide polymer utilized with the aqueous liquid used in an amount in the range of from about 20 to about 120 pounds of polymer per 1,000 gallons of water, brine or seawater to form a gelled aqueous liquid having a viscosity in the range of from about 10 centipoises aqueous carrier liquid includes from about 30 to about 80 pounds of gelling agent per 1000 gallons of water, brine or seawater, and has a viscosity of from about 15 to about 100 centipoises.

The gelled aqueous carrier liquid preferably contains a gel breaker which serves to reduce the viscosity of the gel at a time substantially coincident with the completion of the placement of the coated particulate material at the desired location in a subterranean formation. That is, the gel breaker causes the gelled carrier liquid to revert to a low viscosity liquid which readily separates from the deposited particulate material and leaks-off into permeable strata surrounding the deposit location.

As mentioned above, breaking the gelled carrier liquid allows it to separate from the particulate material and enter or filter into permeable strata adjacent the deposit location. While a variety of gel breakers which are well known in the prior art can be utilized, an enzyme-type breaker such as cellulase for a substituted cellulose gelling agent and a hemi-cellulase for a substituted galactomannan gelling agent are preferred.

As is well known in the art, relatively small quantities of the enzyme breaker used are generally required, but as is well known in the art, the particular quantity depends upon the pH, temperature, and specific time period required between addition of the gel breaker and the breaking of the gel. As will be understood, the greater the quantity of gel breaker used, the shorter will be such time period.

The gelled aqueous carrier liquid containing the coated sand can be crosslinked to increase its viscosity if desired.

A variety of surface active agents can be utilized to promote substantially instantaneous coating of particulate material with the resin in the presence of a gelled aqueous carrier liquid, but the preferred surface active agent is a mixture of one or more cationic surface active agents and one or more non-cationic surface active agents. As used herein, a non-cationic surface active agent includes a blend of anionic and non-ionic surface active agents.

A surface active agent is the ingredient necessary to produce the substantially instantaneous coating of the particulate material with the epoxy resin in the presence of the gelled aqueous carrier liquid. A non-cationic surface active agent will achieve the desired coating when certain galactomannan gelling agents are utilized, but the preferred surface active agent is a blend of cationic and non-cationic surface active agents.

The cationic surface active agents useful herein are preferably the reaction product of an alcohol, epichlorohydrin and triethylenediamine wherein monohydric aliphatic alcohols having in the range of from about 12 to about 18 carbon atoms are reacted with from 2 to 3 moles of epichlorohydrin per mole of alcohol followed by reaction with an excess of triethylenediamine. The alcohol epichlorohydrin reaction product contains an ethoxylation chain having pendent chlorides. The subsequent reaction with triethylenediamine provides a cationic and a tertiary amine functionality to the resulting surfactant product.

The non-cationic surfactants are preferably ethoxylated fatty acids produced by reacting fatty acids containing from about 12 to about 22 carbon atoms with from about 5 to about 20 moles of ethylene oxide per mole of acid, most preferably from about 12 to about 18 moles of ethylene oxide per mole of acid, to produce a mixture of various quantities of ethoxylated acids and unreacted acids.

When the gelling agent used herein is a cellulose derivative, then one preferred surface active agent is a blend comprised of isopropyl alcohol, the cationic agent described above and the non-cationic agent described above wherein the weight ratio of cationic agent to non-cationic agent in the blend is in the range of about 0.4 to 1, and preferably about 0.6, parts by weight cationic agent per 1 part by weight non-cationic agent and wherein the weight ratio of isopropyl alcohol to non-cationic agent in the blend is about 1 part by weight alcohol per 1 part by weight non-cationic agent.

When the gelling agent used herein is a galactomannan gum, then one preferred surface active agent is a blend comprised of amyl alcohol, the cationic agent described above and the non-cationic agent described above wherein the weight ratio of cationic agent to non-cationic agent in the blend is in the range of about 0 to 1, and preferably about 0.2, parts by weight cationic agent per 1 part by weight non-cationic agent and wherein the weight ratio of amyl alcohol to non-cationic agent in the blend is about 1 part by weight alcohol per 1 part by weight non-cationic agent.

The alcohol constituent of the above described blends functions as a solubilizer and diluent for the cationic and non-cationic surfactants. Appropriate substitutes for amyl alcohol include other similar alcohols, for example isopropyl alcohol, n-hexanol and fusel oil.

A substantially continuous stream of the surface active agent utilized is mixed with the gelled aqueous carrier liquid, the resin composition and the particulate material at a rate whereby the amount of active surface active agent present in the mixture is in the range of from about 0.25 to about 10.0 gallons of surface active agent per 1000 gallons of gelled aqueous carrier liquid. Most preferably, when a galactomannan gelling agent is used, the active surface active agent is present in the mixture in an amount of about 0.5 gallon per 1000 gallons of gelled aqueous carrier liquid; when a cellulose derivative gelling agent is used, the active surface active agent is present in an amount of about 2 gallons per 1000 gallons of gelled aqueous carrier liquid.

Various types of particulate material can be used in accordance with the present invention, e.g., sand, sintered bauxite, etc. The preferred particulate material is sand, the particle size of which being in the range of from about 10 to about 70 mesh U.S. Sieve Series, with the preferred sizes being 10–20 mesh, 20–40 mesh or 40–60 mesh, or 50–70 mesh depending upon the particle size and distribution of formation sand adjacent to which the resin coated sand is to be deposited.

A substantially continuous stream of sand is combined with the gelled aqueous carrier liquid-surface active agent-resin composition mixture at a rate whereby the amount of sand present in the mixture is in the range of from about 2 to about 20 pounds of sand per gallon of gelled aqueous carrier liquid. Most preferably, the sand is present in the mixture in an amount in the range of from about 3 to about 15 pounds per gallon of carrier liquid.

The resin composition utilized in accordance with this invention for substantially instantaneously coating particulate material in the presence of the above-described surface active agent and gelled aqueous carrier liquid is comprised of a hardenable polyepoxide resin (epoxy resin), a solvent system, a hardener, a coupling agent, and a hardening rate controller. The polyepoxide resin, the hardener and the coupling components of the resin agent composition substantially instantaneously coat the particulate material in the presence of the gelled aqueous carrier liquid and the surface active agent.

The resin composition, above defined, is present in the mixture of ingredients in the range of from about 1.00 to about 20 pounds of resin composition per each 100 pounds of particulate material. It is believed that the density of the resin composition will vary in the range from about 1.05 to about 1.16 grams per milliliter depending upon the specific content of the composition.

While various polyepoxide resins can be utilized, preferred resins are the condensation products of epichlorohydrin and bisphenol A. A commercially available such product is marketed by the Shell Chemical Company of Houston, Tex., under the trade name EPON 828. EPON 828 resin exhibits good temperature stability and chemical resistance and has a viscosity of about 15,000 centipoises.

In one preferred embodiment, the solvent system is comprised of a first, polar, organic diluent which, in all cases, is miscible with the polyepoxide resin and substantially immiscible with water, and a second polar, organic, diluent which, in all cases, is miscible with but substantially non-reactive with the polyepoxide resin. The first and second diluents are present in the resin composition in amounts sufficient to adjust the viscosity of the resin composition to a level in the range of from about 100 centipoises to about 800 centipoises.

The first polar organic diluent is present in the resin composition in the range of from about 2 to about 35, preferably from about 15 to about 30, and most preferably about 28 parts by weight per 100 parts by weight of the epoxy resin component. The second polar organic diluent is present in the resin composition in the range of from about 4 to 20, preferably from about 8 to 15 and most preferably about 10 parts by weight per 100 parts by weight of the epoxy resin component.

In a more preferred system, the second polar organic diluent is also substantially immiscible with water.

In the most preferred system, the first polar organic diluent is also substantially reactive with the epoxy resin component.

The preferred first polar organic diluent which is reactive with the epoxy resin component is selected from the group consisting of butyl glycidyl ether, cresol glycidyl ether, allyl glycidyl ether, phenyl glycidyl ether or any other glycidyl ether which is miscible with the epoxy resin. Of these, butyl glycidyl ether and ortho-cresol glycidyl ether are the most preferred. The reactive diluent reacts with the hardening agent and also functions to reduce the viscosity of the epoxy resin.

The second polar organic diluent which is not reactive with the epoxy resin component is essential because it contributes to the lowering of the viscosity of the resin, and, in combination with the surface active agent, brings about the substantially instantaneous coating of the particulate material with the resin in the presence of the gelled aqueous carrier liquid.

The preferred non-reactive diluent is of low molecular weight, is miscible with the epoxy resin, is substantially immiscible with water and is selected from the group consisting of compounds having the structural formula:

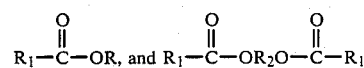

wherein:
R is $(C_nH_{2n+1})$ and n is an integer in the range of from about 1 to about 5;
$R_1$ is $(C_mH_{2m+1})$ and m is 0 or an integer in the range of from 1 to about 4, or

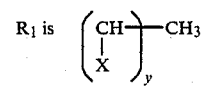

and y is an integer in the range of from 1 to about 4, and X is independently H or OH; and
$R_2$ is $C_aH_{2a}$ and a is an integer in the range of from 2 to about 5.

Of the various compounds falling within the group described above, ethyl acetate, butyl lactate, ethyl lactate, amyl acetate, ethylene glycol diacetate and propylene glycol diacetate are preferred. Of these, butyl lactate is the most preferred. Butyl lactate has a molecular weight of 130 and a water solubility of 1 gram per 1,000 grams of water.

Methyl alcohol, which is partially soluble in the polyepoxide resin, and other low molecular weight alkanols also are useful second diluents.

Other chemicals such as tetrahydrofurfuryl methacrylate and ethyl acetate can be either the first or the second polar organic diluent as each of these do satisfy the definitions of both types of diluents as set out above.

A variety of hardening agents can be used in this invention to cause the hardening of the resin. Examples of such hardening agents include amines, polyamines, amides and polyamides known to those skilled in the art. A preferred hardening agent is methylene dianiline, either dissolved in a suitable solvent such as ethyl acetate or in a liquid eutectic mixture of amines diluted with methyl alcohol. A particularly preferred hardening agent is a liquid eutectic mixture of amines diluted with about 22% by weight methyl alcohol, the eutectic mixture containing about 79% by weight methylene dianiline with the remaining amines being comprised of primary aromatic amines and meta-phenylene diamine. Such a liquid eutectic mixture is commercially available under the trade name TONOX 22 from the Uniroyal Chemical Co. of Naugatuck, Conn.

The quantity of hardening agent useful herein is dependent to a great extent upon the chemical nature of the hardener itself. It is, accordingly, difficult to specify in detail the amount of hardener to be used. However, in a broad sense, it is believed that the hardener is present in the range of from about 2 to about 150 parts by weight per 100 parts by weight of epoxy resin. When the hardener is an aromatic amine, the weight range is from about 8 to about 50. One aromatic amine, methylene dianiline, is useful when present in the range of from about 25 to about 38 parts by weight per 100 parts by weight of epoxy resin. When the hardener is an aliphatic amine, for example a dimethylaminomethyl substituted phenol, the hardener weight range is from about 2 to about 15 parts by weight per 100 parts by weight of epoxy resin.

The mixture of ingredients also preferably includes a resin-to-particulate material coupling agent to promote bonding of the resin to the particulate material such as a functional silane. Preferably, a N-beta-(aminoethyl)-gamma -aminopropyltrimethoxysilane resin-to-sand coupling agent is included in an amount in the range of from about 0.1 to about 2 parts by weight per 100 parts by weight of epoxy resin. A commercially available product is Union Carbide Silane A-1120 (Danbury, Conn.).

The mixture can also include retarders or accelerators as hardening rate controllers to lengthen or shorten the working and cure times of the resin. When retarders are used, low molecular weight organic acid ester retarders are preferred. Examples of such retarders are alkyl esters of low molecular weight alkyl acids containing about 2 to 3 carbon atoms. Suitable accelerators include 2,4,6-tris dimethyl amino methyl phenol, the ethyl hexonate salt thereof, and weak organic acids such as fumaric, erythorbic, ascorbic, salicylic and maleic acids. If a retarder or accelerator is utilized, it is combined therewith in an amount up to about 0 to 10 parts by weight per 100 parts by weight of epoxy resin.

As mentioned above, if it is desired to increase the viscosity of the gelled aqueous carrier liquid-resin composition coated particulate material slurry, a continuous stream of liquid crosslinker can be combined with the slurry depending upon the type of gelling agent utilized. Examples of crosslinkers which can be utilized are those selected from the group consisting of titanium, aluminum, zirconium and borate salts. Preferred crosslinkers are titanium lactate, titanium triethanolamine, aluminum acetate and zirconium salts. Generally, the crosslinker used is in the form of a solvent containing solution which is combined with the slurry at a rate which results in the crosslinker being present in an amount equivalent to the range of from about 0.05 to about 5.0 gallons of an approximately 30% by weight solution of the crosslinker per 1000 gallons of gelled aqueous carrier liquid. Also, depending upon the particular crosslinker used, a pH buffering agent may be combined with the gelled aqueous carrier liquid-coated particulate material slurry.

Based upon 100 parts by weight of epoxy resin, the resin composition is preferably comprised of the above-described epichlorohydrin-bisphenol A epoxy resin (100 parts by weight), a water immiscible reactive diluent comprised of ortho-cresol glycidyl ether present in an amount in the range of from about 20 parts by weight to about 35 parts by weight, a nonreactive diluent comprised of butyl lactate present in an amount in the range of from about 4 parts by weight to about 12 parts by weight and a hardening agent comprised of a water miscible solvent diluted liquid eutectic mixture of primary aromatic amines, methylene dianiline and metaphenylene diamine present in an amount in the range of from about 25 parts by weight to about 45 parts by weight. When the water immiscible reactive diluent used in the resin composition is butyl glycidyl ether instead of ortho-cresol glycidyl ether, it is present in an amount in the range of from about 2 parts by weight to about 20 parts by weight.

The above-described resin composition has a viscosity in the range of from about 400 centipoises to about 150 centipoises, and has an approximate working time without retarders or accelerators present, i.e., a time period between mixing and when the viscosity of the composition exceeds about 1500 centipoises, of about 2 hrs. at normal ambient conditions (about 72° F.). The cure time for the resin composition, i.e., the time from when the viscosity reaches about 1500 centipoises to when the resin composition has fully hardened is about 80 hrs. at 72° F.

A specific preferred resin composition for use in accordance with the present invention is comprised of 100 parts by weight of an epichlorohydrin and bisphenol A epoxy resin, butyl glycidyl ether present in an amount of about 11 parts by weight, butyl lactate present in an amount of about 8 parts by weight, a liquid eutectic mixture of primary aromatic amines, methylene dianiline and metaphenylene diamine diluted with about 22% by weight methyl alcohol present in an amount of about 36 parts by weight, N-beta (aminoethyl)-gamma-aminopropyltrimethoxysilane present in an amount of about 0.8. parts by weight, and the ethyl hexonate salt of dimethyl amino methyl phenol present in an amount of about 7 parts by weight. This resin composition has a viscosity of about 200 centipoises, a working time of about 0.5 hours and a cure time of about 8 hrs. at 80° F. When the accelerator (ethyl hexonate salt of dimethyl amino methyl phenol) is not present in the composition, it has a working time of about 2.0 hrs. and a cure time of about 84 hrs.

In carrying out the method of the present invention, and referring to FIG. 1, an aqueous gelled carrier liquid is first prepared in a container 10 by combining a polysaccharide polymer of the type described above with fresh water, brine or seawater. The water and polymer are carefully mixed with slow agitation whereby the polymer is hydrated. Alternatively, the gel may be made from a concentrated solution of gelling agent as is known to those skilled in the art.

A substantially continuous stream of the aqueous gelled carrier liquid from the container 10 is conducted by way of a conduit 12 to a mixing tub 14. Simultaneously, a continuous stream of liquid surface active agent of the type described above is preferably conducted from a container 16 to the conduit 12 by way of a conduit 18 connected therebetween.

A substantially continuous stream of particulate material, e.g., sand, is conducted to the mixing tub 14 from a container 20 by a conveyor 22 connected therebetween.

The liquid epoxy resin composition described above may be premixed in a container 24, and a substantially continuous stream thereof is continuously conducted therefrom to the mixing tub 14 by way of a conduit 26 connected therebetween.

Simultaneously with all of the above-described streams of components, a substantially continuous stream of liquid gel breaker is preferably conducted from a container 28 to the conduit 12 by a conduit 30. The liquid gel breaker combines with the gelled aqueous carrier liquid and the surface active agent flowing through the conduit 12 and is conducted therewith to the mixing tub 14.

As indicated in the drawing, the liquid gel breaker or a powdered solid gel breaker can optionally be introduced directly into the mixing tub 14. Occasionally the gel breaker is handled in a solid form, either as a powder or as an adsorbate on inert particles, such as sand, salt or sugar. These can be directly introduced into the mixing tub. If desired to provide this flexibility, the conduit 30 can contain a shut-off valve 32, and a conduit 34 having a shut-off valve 36 disposed therein can connect the conduit 30 upstream of the shut-off valve 32 to the mixing tub 14 whereby the liquid gel breaker can be introduced directly into the mixing tub. However, as will be understood by those skilled in the art, any container-conduit arrangement can be utilized which brings the component streams described into the mixing tub 14 or equivalent mixing apparatus simultaneously.

The component streams are intimately mixed in the mixing tub 14 and remain therein for a residence time of approximately 10 seconds. During such time, the particulate material is coated with the resin composition and suspended in the gelled aqueous carrier liquid.

The gelled aqueous carrier liquid-resin coated particulate material slurry formed in the mixing tub 14 is withdrawn therefrom by way of a conduit 38 which conducts a continuous stream of the slurry to one or more pumps 40. A conduit 42, connected to the discharge of the pumps 40, conducts the slurry to a conduit system disposed in a well bore and to a subterranean zone wherein the resin coated particulate material is to be deposited and consolidated into a hard permeable mass. If a crosslinker is utilized, it is added to the slurry downstream of the mixing tub 14, i.e., the crosslinker is conducted from a container 44 to the conduit 38 by a conduit 46 connected therebetween.

The resin coated particulate material can be utilized in the performance of gravel packing procedures or as a proppant material in fracturing treatments performed upon a subterranean formation. The resin coated particulate also can be utilized in the formation of controlled permeability synthetic formations within a zone of a subterranean formation.

A significant aspect of the methods of this invention is the ability to substantially instantaneously coat the particulate material with the resin composition and continuously suspend the coated particulate material in a continuous stream of gelled aqueous carrier liquid. This is accomplished by the particular resin composition and combination of component streams which promote the coating of the resin composition on the particulate material. The continuous stream of gelled aqueous carrier liquid-resin coated particulate material slurry formed is generally insensitive to variations in pH within the range of from about 5 to about 8.5 and variations in temperature within the range of from about 45° F. to about 100° F. The cure time of the resin composition can be short, i.e., less than about 6 hrs., and the resin composition can aquire substantial strength rapidly, i.e., within a time period of about 12 hours or less.

As is well understood by those skilled in the art, it may be desirable to condition the formation adjacent the consolidation placement location by preflushing the formation. Also, after-flushes may be used to insure uniform placement, consolidation and maximum permeability of the deposited particulate material as well as of particulate material existing in the formation.

In order to further illustrate the methods of the present invention and facilitate a clear understanding thereof, the following examples are given.

Tests are performed to determine the effectiveness of various resin compositions containing various reactive and non-reactive diluents to coat sand and to produce highstrength consolidations therefrom in the presence of water gelled with various gelling agents.

EXAMPLE 1

| Formulation: | |
|---|---|
| Tap water | 1 liter |
| Potassium chloride | 20 grams |
| Sodium diacetate | 1.2 grams |
| Hydroxypropyl guar[1] (HPG) | 4.8 grams |
| Fumaric acid | 0.5 grams |

[1]Contains 0.39 moles propylene oxide substituents per pyranose unit.

Procedure

The tap water, potassium chloride and sodium diacetate are mixed to produce a solution. The hydroxypropyl guar (HPG) is then added to the solution and stirred. Thereafter, the fumaric acid is added. The resulting mixture is then permitted to stand overnight in a covered container. The pH of the formed gel is in the range of about 6.8 to about 7.5.

Tests are conducted using samples of the HPG gel formed above, together with other ingredients.

| Formulation: | |
|---|---|
| HPG gel | 250.00 ml |
| Surfactant mixture[1] | 0.25 ml |
| Resin composition[2] | 21.00 ml (1.148 gm/ml) |
| Ottawa Sand 40/60 mesh (USS) | 450.00 grams |
| 1 Surfactant Mixture: | |
| Amyl alcohol | 45 parts by weight of mixture |
| Cationic surface active agent (previously described) | 10 parts by weight of mixture |
| Non cationic surface active agent (previously described) | 45 parts by weight of mixture |
| 2 Resin Composition: | |
| EPON 828 (Shell Chemical Com- | 100 parts by weight |

| | -continued | |
|---|---|---|
| pany) reaction product of epichlorohydrin and Bisphenol A | | |
| Hardener Blend eutectic mixture of primary aromatic amines, meta-phenylene diamine, methylene dianiline (about 78% by weight of hardener blend) methyl alcohol (about 22% by weight of hardener blend) | 42 parts by weight | |
| Silane Coupling Agent N—beta-(aminoethyl)-gamma-aminopropyltrimethoxysilane | 0.66 parts by weight | |
| Diluent 1 | Variable parts by weight | |
| Diluent 2 non-reactive diluent (varies) | Variable parts by weight | |

Procedure

The ingredients are mixed together to form slurries each of which is stirred for two minutes in a beaker and then transferred to a laboratory consistometer cup and stirred for an additional 60 minutes. Each slurry is examined visually and poured into one or more tubes to permit consolidation of the sand. The consolidation tubes are glass tubes coated with mold release agent and stoppered at one end. The sand in each slurry within each tube is tamped down and allowed to cure for 20 hours at the temperature indicated in Table I. After curing, the glass tubes are broken and the consolidated sand samples are tested for compressive strength. The results of these tests are given in Table I below.

TABLE I
COMPRESSIVE STRENGTH OF SAND CONSOLIDATIONS

| Run No. | Diluent 1 Chemical | Parts By Weight[1] | Diluent 2 Chemical | Parts By Weight[1] | Cure Temperature, °F. | Compressive Strength, psi |
|---|---|---|---|---|---|---|
| 1 | butyl glycidyl ether | 27 | butyl lactate | 7 | 170 | 5500 |
| 2 | butyl glycidyl ether | 14 | methyl alcohol | 7 | 170 | 5340 |
| 3 | butyl glycidyl ether | 13 | methyl alcohol | 7 | 120 | 3600 |
| 4 | butyl glycidyl ether | 14 | ethyl acetate | 14 | 170 | 3560 |
| 5 | butyl glycidyl ether | 30 | THFMA[2] | 7 | 170 | 2100 |
| 6 | THFMA[2] | 11 | methyl alcohol | 6 | 170 | 2000 |
| 7 | ethyl acetate | 14.5 | methyl alcohol | 5 | 120 | 1600 |
| 8 | ethyl acetate | 10 | methyl alcohol | 5 | 120 | 1560 |
| 9 | ethyl acetate | 25 | methyl alcohol | 6 | 170 | 1470 |
| 10 | — | | ethyl acetate | 28 | 120 | 400 |

[1]Based on 100 parts by weight of epoxy resin
[2]tetrahydrofurfuryl methacrylate From Table I it can be seen that the consolidations having the highest compressive strength contain both a reactive and a non-reactive diluent in the resin composition and that when the resin composition contains a butyl glycidyl ether reactive diluent and butyl lactate non-reactive diluent, an excellent consolidation is achieved.

EXAMPLE 2

Tests are conducted to determine the sand coating times of various resin compositions in the presence of water gelled with hydroxypropylguar and a surfactant.

250 cc samples of aqueous gel containing surfactant and 40–60 mesh Ottawa sand are prepared in accordance with the procedure and in the quantities described in Example 1. The resin compositions described in Table II below are prepared and added to the gel surfactant sand samples in amounts of 28 ml of resin composition per sample. After adding the resin composition, each mixture is stirred in a beaker and the time for coating to take place determined by visual observation. That is, the resin composition is deemed to coat when resin does not remain in the gel when stirring is stopped. Excess resin is easily visible if coating has not occurred as it settles in a layer on top of the sand with the gelled water above the resin.

In tests 3, 4 and 5, using the same resin composition, the stirring is stopped after 5, 10 and 60 second intervals and the samples immediately transferred to consolidation tubes, cured at 170° F. and tested for compressive strength. The results of these tests are given in Table II below.

TABLE II
COATING TIMES OF VARIOUS RESIN COMPOSITIONS

| Test No. | Resin Formulation Components | Amount in Resin Composition, Parts by Weight | Mixing Time | Compressive Strength |
|---|---|---|---|---|
| 1 | epoxy[1,3] | 55 | about 5 sec. | Not run - sample coated |
| | butyl lactate | 4 | | |
| | cresyl glycidyl ether | 15 | | |
| | methyl alcohol | 6 | | |
| | hardener[2] | 20 | | |
| 2 | epoxy[1,3] | 55 | 1 to 5 sec. | Not run - sample coated |
| | butyl lactate | 4 | | |
| | cresyl glycidyl ether | 15 | | |
| | methyl alcohol | 6 | | |
| | hardener[2] | 20 | | |
| 3 | epoxy resin[1,3] | 55 | 5 sec | 2206 psi |
| | butyl lactate | 4 | | |
| | cresyl glycidyl ether | 15 | | |
| | methyl alcohol | 6 | | |
| | hardener[2] | 20 | | |
| 4 | epoxy resin[1,3] | 55 | 10 sec | 2950 psi |
| | butyl lactate | 4 | | |
| | cresyl glycidyl ether | 15 | | |
| | methyl alcohol | 6 | | |
| | hardener[2] | 20 | | |
| 5 | epoxy resin[1,3] | 55 | 60 sec | 3100 psi |
| | butyl lactate | 4 | | |
| | cresyl glycidyl ether | 15 | | |
| | methyl alcohol | 6 | | |
| | hardener[2] | 20 | | |

[1]Shell Chemical Co., EPON 828
[2]Liquid eutectic mixture of primary aromatic amines, methylene dianiline (79% by weight) and meta-phenylene diamine.
[3]All tests had 0.5 parts by weight N—beta-(aminoethyl)-gamma-aminopropyltrimethoxysilane

EXAMPLE 3

A test is run to determine the compressive strength of a sand consolidation formed in accordance with the present invention at a temperature of 250° F. A gelled aqueous carrier liquid is prepared by adding 9.6 grams of hydroxyethylcellulose (D.S. of 2.5) to one liter of fresh water having 30 grams of potassium chloride dissolved therein. After hydration of the hydroxyethylcellulose, 4 ml of a surfactant blend comprised of 50 parts by weight amyl alcohol, 37 parts by weight non cationic surfactants and 13 parts by weight cationic surfactants is combined with the aqueous gel followed by 1800 grams of 40-60 mesh (U.S. Sieve Series) Ottawa sand and 84 ml of the resin composition described in Table III below.

The resulting slurry is stirred in a beaker for 2 minutes and then transferred to a laboratory consistometer cup and stirred for an additional 60 minutes. After stirring, the slurry is poured into a consolidation tube and allowed to cure in the same manner as described in Example 1 for 48 hours at 170° F. The temperature is then gradually raised to 250° F. and the sample is allowed to cure for an additional 48 hours. After curing, the consolidation is cooled over a 4-hour period to room temperature, trimmed, and prepared for compressive strength testing. The sample is then gradually reheated to 250° F., at which temperature compression strength testing is carried out. The results of this test are given in Table III below.

TABLE III

COMPRESSIVE STRENGTH OF SAND CONSOLIDATION

| Resin Composition Components | Amount, Parts by Weight | Compressive Strength at 250° F. |
| --- | --- | --- |
| epoxy[1] | 60.0 | 2510 psi |
| butyl lactate | 5.0 | |
| butyl glycidyl ether | 6.0 | |
| Hardener[2] | 21.0 | |
| coupling agent[3] | 0.5 | |
| methyl alcohol | 7.0 | |

[1]Shell Chemical Co. EPON 828
[2]Liquid eutectic mixture of primary aromatic amines, methylene dianiline (about 79% by weight) and meta-phenylene diamine
[3]N—beta-(aminoethyl)-gamma-aminopropyltrimethoxysilane

EXAMPLE 4

Tests are conducted to determine the effect of order of addition of components on the compressive strengths of the consolidations formed.

A gelled aqueous liquid is formed utilizing hydroxyethylcellulose in accordance with the procedure set forth in Example 1. To 250-milliliter samples of the aqueous gel, surfactant described in Example 1, sand described in Example 1, the resin composition of Table III and an accelerator comprised of 2,4,6-tris dimethyl amino methyl phenol are added to the aqueous gel in various orders of introduction. The resulting slurries are each stirred for one minute in a beaker and then transferred to a laboratory consistometer cup and stirred for an additional 60 minutes. Each slurry is then poured into a consolidation tube and allowed to cure for the time and at the temperature indicated in Table IV below. The compressive strength of the resulting consolidations are determined.

The results of these tests are given in Table IV below.

TABLE IV

EFFECT OF ORDER OF ADDITION ON COMPRESSIVE STRENGTH OF CONSOLIDATIONS

| Order of Addition to Gel | | | Cure Time, hr | Cure Temperature, °F. | Compressive Strength, psi |
| --- | --- | --- | --- | --- | --- |
| 1 | 2 | 3 | | | |
| Surfactant | Sand | Resin (including DMP-30[1]) | 20 | 80 | 2840 |
| Surfactant | Sand | Resin (including DMP-30) | 20 | 100 | 3160 |
| Surfactant | Sand | Resin (including DMP-30) | 20 | 140 | 3940 |
| Surfactant | Sand | Resin (including DMP-30) | 48 | 140 | 5660 |
| Surfactant and DMP-30 | Sand | Resin | 20 | 80 | 1220 |
| Surfactant | Resin (including DMP-30) | Sand | 24 | 120 | 5360 |

[1]DMP-30 is 2,4,6-tris dimethylamino methyl phenol, an accelerator.

EXAMPLE 5

Figure 2:
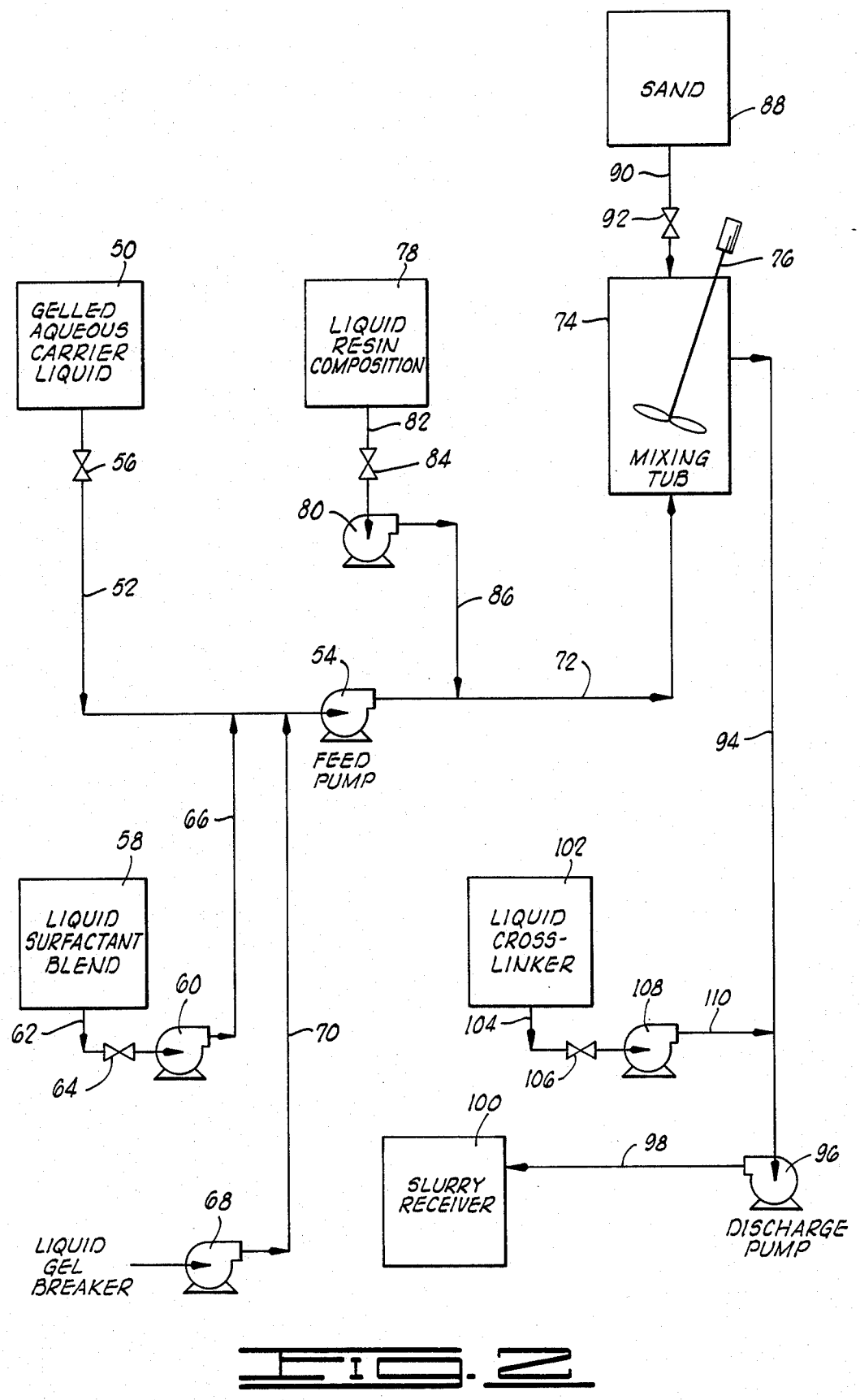
FIG. 2 is a schematic illustration of laboratory apparatus used for simulating the performance of the methods the invention in the field.

The laboratory system illustrated schematically in FIG. 2 is used to simulate the equipment used in acutal field operations and for carrying out the methods of this invention. The system is comprised of a gelled aqueous carrier liquid container 50 connected by tubing 52 to the suction connection of a ⅓ horsepower, 3,425 rpm centrifugal feed pump 54. A shut-off valve 56 is disposed in the tubing 52.

A liquid surfactant blend container 58 is connected to the suction connection of a concentric cam fluid metering pump 60 by tubing 62 having a shut-off valve 64 therein. The discharge connection of the pump 60 is connected to the tubing 52 by tubing 66. The discharge connection of a 50 cc syringe pump 68 for injecting liquid gel breaker is connected by tubing 70 to the tubing 52.

The discharge connection of the feed pump 54 is connected by tubing 72 to a 450 cc over-flow mixing tub 74 equipped with an electric stirrer 76.

A liquid resin composition container 78 is connected to the inlet connection of a concentric cam fluid metering pump 80 by tubing 82 having a shut-off valve 84 disposed therein. The discharge of the pump 80 is connected by tubing 86 to the tubing 72.

A sand container 88 is positioned above the mixing tub 74 having a sand outlet 90. A shut-off valve 92 is disposed in the outlet 90 which is positioned to introduce sand into the mixing tub 74.

When a test run is made, the valves 56, 64, and 84 are opened and the pumps 54, 60, 68 and 80 are started whereby continuous streams of gelled aqueous carrier liquid, resin composition, surfactant blend and gel breaker, at desired flow rates, are pumped into the mixing tub 74. Simultaneously, a continuous stream of sand is introduced into the mixing tub 74 by way of valve 92 and outlet 90 at a desired flow rate. The stirrer 76 is activated whereby a gelled aqueous carrier liquid-resin coated sand slurry is formed in the mixing tub 74.

The slurry produced in the mixing tub 74 overflows the tub conducted by way of tubing 94 connected thereto and to an air-powered opposed piston discharge pump 96. The discharge connection of the pump 96 is connected by tubing 98 to a container 100 for receiving the slurry.

A liquid crosslinker container 102 is connected by tubing 104 to the inlet connection of a high pressure pump 108. A shut-off valve 106 is disposed in the tubing 104 and a tubing 110 connects the discharge conneciton of the pump 108 to the tubing 94. When a crosslinker is combined with the slurry flowing through the pump 96 into the receiver 100, it is injected into the slurry by way of the pump 108, tubing 110 and tubing 94 at a controlled continuous flow rate.

The various component streams and flow rates thereof utilized in carrying out the tests using the laboratory apparatus described above are as follows:

Gelled aqueous carrier liquid is introduced into the container 50. The gelled aqueous carrier liquid is comprised of a 2% KCl brine gelled with hydroxypropyl-guar in an amount of 40 pounds per 1,000 gallons of brine. The gelled aqueous carrier liquid is conducted from the container 50 to the feed pump 54 at a flow rate of ½ gallon per minute to 1 gallon per minute whereby continuous flow can be sustained for about 20 minutes before refilling of the container 50 is necessary.

The liquid resin composition used is described in Example 3. The resin composition is introduced into the container 78, and the flow rate of resin composition pumped the pump 80 is varied up to 56 cc per minute. Sand from the container 88 is introduced into the mixing tub 74 at a varied rate of 1 pound to 4 pounds per minute whereby a resin-to-sand ratio of about 0 to 0.6 gallons of resin composition per 100 pounds of sand results in the mixing tub 74.

The liquid surfactant blend described in Example 1 is introduced into the container 58 and pumped to the feed pump 54 at a rate in the range of from 0.0 cc per minute to 8.4 cc per minute.

The liquid gel breaker utilized is an enzyme breaker of a type previously described herein and is used as a 1 gram per 100 cc aqueous solution. The solution is introduced to the feed pump 54 at the rate of 10 cc per minute.

The crosslinker utilized is prepared by diluting a solution of titanium triethanolamine with 50% by volume tap water at least 30 minutes and not more than 2 hours before use. When used, the crosslinker is pumped into the slurry flowing through the tubing 94 at a rate equivalent to about 0 to about 0.8 cc of crosslinker per liter of slurry.

Gelled aqueous carrier liquid-resin coated particulate slurries are formed in the mixing tub 54 and colmaterial lected in the slurry receiver 100. Portions of the slurries are poured into consolidation tubes and compressive strength tests are conducted as described in Example 1. The results of these tests with and without cross-linker are given in Table V below.

TABLE V

| Amount of Resin Composition Used, cc per Liter of Gelled Aqueous Carrier Liquid | Amount of Surfactant Used, cc per Liter of Gelled Aqueous Carrier Liquid | Amount of Gel Breaker Used,[1] cc per Liter of Gelled Aqueous Carrier Liquid | Amount of Cross-linker Used, cc per Liter of Gelled Aqueous Carrier Liquid | Amount of Sand Used, lb. per Gallon of Gelled Aqueous Carrier Liquid | Cure Temperature, °F. | Compressive Strength psi |
| --- | --- | --- | --- | --- | --- | --- |
| 10 | 1 | 1 | .4 | 4 | 170 | 50 |
| 10 | 4 | 1 | 0 | 4 | 170 | 150 |
| 11 | 4 | 1 | .4 | 2 | 170 | 158 |

[1]Gel breaker diluted 1 g/100 cc tap water.

EXAMPLE 6

The procedure of Example 5 is repeated except that the amount of surfactant used, the amount of crosslinker used and the cure temperature are varied. The results of these tests are given in Table VI below.

TABLE VI

COMPRESSIVE STRENGTHS USING VARYING AMOUNTS OF SURFACTANT AND CROSSLINKER

| Amount of Resin Composition Used, cc per Liter of Gelled Aqueous Carrier Liquid | Amount of Surfactant Used, cc per Liter of Gelled Aqueous Carrier Liquid | Amount of Gel Breaker Used,[1] cc per Liter of Gelled Aqueous Carrier Liquid | Amount of Cross-linker Used, cc per Liter of Gelled Aqueous Carrier Liquid | Amount of Sand Used, lb. per Gallon of Gelled Aqueous Carrier Liquid | Cure Temperature, °F. | Compressive Strength psi |
| --- | --- | --- | --- | --- | --- | --- |
| 15 | 2.7 | 1 | 0 | 4 | 72 | 150 |
| 15 | 4.5 | 1 | 0 | 4 | 72 | 500 |
| 15 | 4.5 | 1 | 0.8 | 4 | 170 | 670 |
| 15 | 2.5 | 1 | 0.8 | 4 | 170 | 785 |
| 0 | 1.5 | 1 | 0.8 | 4 | 170 | 0 |

[1]Gel breaker diluted, 1 g/100 cc tap water

EXAMPLE 7

The procedure of Example 6 is repeated except that the surfactant utilized is comprised of an aqueous 50 parts by weight amyl alcohol solution having the cationic surface active agents described previously herein dissolved therein in an amount of abaout 7 parts by weight, and the non-cationic surface active agents described previously dissovled therein in an amount of about 43 parts by weight; the crosslinker is titanium triethanolamine; and the sand concentration is varied. The results of these tests are given in Table VII below.

TABLE VII

COMPRESSIVE STRENGTHS USING VARYING AMOUNTS OF SURFACTANT AND CROSSLINKER

| Amount of Resin Composition Used, cc per Liter of Gelled Aqueous Carrier Liquid | Amount of Surfactant Used, cc per Liter of Gelled Aqueous Carrier Liquid | Amount of Gel Breaker Used,[1] cc per Liter of Gelled Aqueous Carrier Liquid | Amount of Crosslinker Used, cc per Liter of Gelled Aqueous Carrier Liquid | Amount of Sand Used, lb. per Gallon of Gelled Aqueous Carrier Liquid | Cure Temperature, °F. | Compressive Strength psi |
|---|---|---|---|---|---|---|
| 28 | 2 | 1 | 0 | 4 | 170 | 3910 |
| 15 | 2 | 1 | 0.8 | 4 | 170 | 934 |
| 15 | 3 | 1 | 0.8 | 2 | 170 | 550 |
| 15 | 3 | 1 | 0 | 4 | 170 | 1070 |

[1]Gel breaker diluted, 1 g/100 cc tap water.

EXAMPLE 8

The procedure of Example 6 is repeated except that the gelled aqueous carrier liquid is formed using 50 pounds of hydroxyethylcellulose per 1,000 gallons of brine, the gel breaker is an aqueous enzyme breaker solution (1 gram cellulase per 100 cc) and the surfactant is an aqueous 50 parts by weight isopropyl alcohol solution having the cationic surface active agents described previously herein dissolved therein in an amount of about 20 parts by weight, and the non-cationic surface active agents described previously dissolved therein in an amount of about 30 parts by weight. The results of these tests are given in Table VIII below.

TABLE VIII

COMPRESSIVE STRENGTHS USING VARYING AMOUNTS OF SURFACTANT

| Amount of Resin Composition Used, cc per Liter of Gelled Aqueous Carrier Liquid | Amount Surfactant Used, cc per Liter of Gelled Aqueous Carrier Liquid | Amount of Gel Breaker Used, cc per Liter of Gelled Aqueous Carrier Liquid | Amount of Sand Used, lb. per Gallon of Gelled Aqueous Carrier Liquid | Cure Temperature, °F. | Compressive Strength psi |
|---|---|---|---|---|---|
| 16 | 2 | 1 | 4 | 160 | 2550 |
| 16 | 3 | 1 | 4 | 160 | 2680 |
| 16 | 4 | 1 | 4 | 160 | 4290 |

While that which is considered to be the preferred embodiments of the invention has been described hereinbefore, it is to be understood that modifications and changes can be made in the methods and compositions without departing from the spirit or scope of the invention as hereinafter set forth in the claims.

What is claimed is:

1. A method of continuously forming and suspending consolidatable resin composition coated particulate material in a gelled aqueous carrier liquid comprising intermixing substantially continuous streams of said gelled aqueous carrier liquid, prepared by admixing from about 20 to 120 pounds of a hydratable polysaccharide having a molecular weight of from about 100,000 to about 4,000,000 with an aqueous carrier liquid per 1000 gallons of said carrier liquid, a particulate material, a resin composition which will subsequently harden and a surface active agent whereby said particulate material is substantially continuously coated with said resin composition and suspended in said gelled aqueous carrier liquid, said resin composition comprising a hardenable polyepoxide resin, a hardening agent for said resin, a substantially water immiscible reactive diluent and substantially water immiscible non-reactive diluent for said resin, said reactive and non-reactive diluents being present in said resin composition in amouns sufficient to lower the viscosity of the resin composition to a level in the range of from about 100 to about 800 centipoises at ambient temperature.

2. A method of claim 1 wherein said reactive diluent is present in an amount of from about 2 to about 35 parts per 100 parts by weight of said polyepoxide resin and said non-reactive diluent is present in an amount of from about 4 to about 20 parts per 100 parts by weight of said polyepoxide resin.

3. The method of claim 1 wherein said non-reactive diluent is selected from the group consisting of compounds having the structural formula:

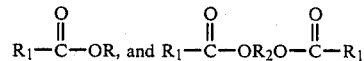

wherein

R is $(C_nH_{2n+1})$ wherein n is an integer in the range of from about 1 to about 5;

$R_1$ is $(C_mH_{2m+1})$ wherein m is O or an integer in the range of from 1 to about 4, or

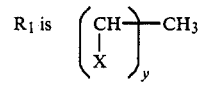

wherein y is an integer in the range of from 1 to about 4, and X is H or OH; and $R_2$ is $C_aH_{2a}$ wherein a is an integer in the range of from 2 to about 5.

4. The method of claim 1 wherein said reactive diluent comprises at least one member selected from the group of butyl glycidyl ether, cresol glycidyl ether, alkyl glycidyl ether and phenyl glycidyl ether.

5. The method of claim 1 wherein said gelled aqueous carrier liquid comprises an aqueous fluid gelled with a polysaccharide comprising at least one member selected from the group of galactomannon gum and derivatives thereof.

6. The method of claim 1 defined further to include admixing a crosslinking agent for said polysaccharide comprising at least one member from the group consisting of titanium, aluminum and zirconium chelates or salts and borate salts with said gelled aqueous carrier liquid.

7. The method of claim 1 wherein said polyepoxide resin is comprised of the condensation product of epichlorohydrin and bisphenol A.

8. The method of claim 1 wherein said hardening agent is a liquid eutectic mixture of methylene dianiline and metaphenylene diamine diluted with a water soluble solvent.

9. The method of claim 1 wherein said surface active agent includes a non-cationic surfactant comprising at least one member selected from the group consisting of ethoxylated fatty acids produced by reacting fatty acids containing from about 12 to about 22 carbon atoms with from about 5 to about 20 moles of ethylene oxide per mole of fatty acid and mixtures of said ethoxylated fatty acids with unreacted fatty acids.

10. A method of continuously forming and suspending consolidatable resin composition coated particulate material in a gelled aqueous carrier liquid comprising intermixing substantially continuous streams of an aqueous carrier liquid gelled by the addition of a polysaccharide polymer thereto, a particulate material, a surface active agent including a noncationic surfactant and a resin composition which will subsequently harden whereby said particulate material is substantially continuously coated with said resin composition and suspended in said gelled aqueous carrier liquid, said resin composition comprising a hardenable polyepoxide resin, at least one substantially water immiscible first diluent for said resin, a second diluent which is non-reactive with said resin and a hardening agent for said resin, said diluents being present in said resin composition in an amount sufficient to lower the viscosity of the resin composition to a level in the range of from about 100 to about 800 centipoises at ambient temperature and said polysaccharide is present in said aqueous carrier liquid in an amount of from about 20 to about 120 pounds per 1000 gallons of said carrier liquid.

11. The method of claim 10 wherein said non-cationic surfactant comprises at least one member selected from the group consisting of ethoxylated fatty acids produced by reacting fatty acids containing from about 12 to about 22 carbon atoms with from about 5 to about 20 moles of ethylene oxide per mole of fatty acid and mixtures of said ethoxylated fatty acids with unreacted fatty acids.

12. The method of claim 10 wherein said second diluent includes at least one member selected from the group consisting of compounds having the structural formula:

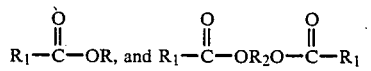

wherein
R is $(C_nH_{2n+1})$ wherein n is an integer in the range of from about 1 to about 5;
$R_1$ is $(C_mH_{2m+1})$ wherein m is O or an integer in the range of from 1 to about 4 or

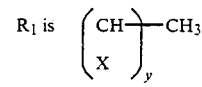

the range of from about 1 to about 4 and X is H or OH; and
$R_2$ is $C_aH_{2a}$ wherein a is an integer in the range of from about 2 to about 5.

13. The method of claim 12 wherein said substantially water immiscible diluent includes at least one member selected from the group of butyl glycidyl ether, cresol glycidyl ether, allyl glycidyl ether and phenyl glycidyl ether.

14. The method of claim 10 wherein said polyepoxide resin is comprised of the condensation product of epichlorohydrin and bisphenol A and said hardening agent is a liquid eutectic mixture of methylene dianiline and metaphenylene diamine diluted with a water soluble solvent.

15. The method of claim 10 defined further to include the steps of introducing the resulting substantially continuous stream of gelled aqueous carrier liquid having resin composition coated particulate material suspended therein into a zone in a subterranean formation; and allowing said resin composition to harden whereby said particulate material is caused to form a hard permeable mass in said zone.

16. The method of claim 15 wherein said zone comprises at least one member selected from the group of a wellbore penetrating said subterranean formation and a fracture created or present in said subterranean formation.

17. The method of claim 10 wherein said second diluent comprises at least one member selected from the group consisting of compounds having the structural formula:

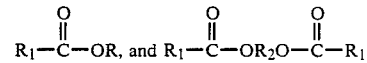

wherein
R is $(C_nH_{2n+1})$ wherein n is an integer in the range of from about 1 to about 5;
$R_1$ is $C_mH_{2m+1}$) wherein m is O or an integer in the range of from about 1 to about 4 or

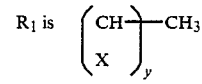

wherein y is an integer in the range of from about 1 to about 4 and X is H or OH; and
$R_2$ is $C_aH_{2a}$ wherein a is an integer in the range of from about 2 to about 5, said member being present in an amount of from about 4 to about 20 parts per 100 parts by weight of said polyepoxide resin and said first diluent comprises at least one member selected from the group consisting of butyl glycidyl ether, cresol glycidyl ether, allyl glycidyl ether and phenyl glycidyl ether, present in an amount of from about 2 to about 35 parts per 100 parts by weight of said polyepoxide resin.

* * * * *